US00RE37239E

(19) United States
(12) Reissued Patent
Eisenberg

(10) Patent Number: US RE37,239 E
(45) Date of Reissued Patent: Jun. 26, 2001

(54) FAST FOOD LAP TRAY

(76) Inventor: Seth G. Eisenberg, 1207 Heather Hill Crescent, Cook County, Flossmoor, IL (US) 60422

(21) Appl. No.: 09/086,761

(22) Filed: May 28, 1998

Related U.S. Patent Documents

Reissue of:
(64) Patent No.: 5,520,119
Issued: May 28, 1996
Appl. No.: 08/249,889
Filed: May 26, 1994

(51) Int. Cl.[7] ..... A47B 23/00
(52) U.S. Cl. ..... 108/43
(58) Field of Search ..... 108/43, 44, 45, 108/26, 25

(56) References Cited

U.S. PATENT DOCUMENTS 2,663,603 * 12/1953 Newman .
2,697,018 * 12/1954 Geirgides ..... 108/43
2,701,173 * 2/1955 Senior et al. ..... 108/43
2,808,191 * 10/1957 Cramer .
5,069,375 * 12/1991 Flick .
5,081,936 * 1/1992 Drieling ..... 108/43
5,127,339 * 7/1992 Hood, Jr. ..... 108/43
5,134,930 * 8/1992 Mei-Hwa ..... 108/43 X
5,221,032 * 6/1993 Bott et al. ..... 108/43 X
5,263,423 * 11/1993 Anderson ..... 108/43
5,355,811 * 10/1994 Brewer ..... 108/43

* cited by examiner

*Primary Examiner*—José V. Chen
(74) *Attorney, Agent, or Firm*—Gary M. Hartman; Domenica N. S. Hartman

(57) ABSTRACT

A fast food lap tray is provided which is particularly suitable for use in an automobile to support and secure fast foods and their containers. The food lap tray includes a pair of pliant leg straps whose lengths are sufficient only to be individually secured beneath the legs of the user. As such, the lap tray is adapted to be positively secured to the lap of the user, yet will not cause discomfort to the user or bind or excessively restrain the legs of the user during use. In particular, the lap tray enables rapid positioning on the lap of the user, as well as rapid removal from the lap of the user. Furthermore, the lap tray does not rely on the vehicle restraint system of the automobile, such as a lap belt, and will not hinder the user from rapidly exiting an automobile if immediate escape is necessary. The lap tray is also configured to maximize its stability on the lap of the user.

13 Claims, 1 Drawing Sheet

FAST FOOD LAP TRAY

Matter enclosed in heavy brackets [ ] appears in the original patent but forms no part of this reissue specification; matter printed in italics indicates the additions made by reissue.

The present invention generally relates to food trays adapted to be placed on a user's lap during use. More particularly, this invention relates to a fast food lap tray which is configured to be readily stabilized and to conform closely to the lap of the user while the user is seated in an automobile seat. The lap tray is also adapted to be easily secured to the user, permits the user to rapidly remove the lap tray and, as a safety feature, enables the user to exit the automobile without first removing the lap tray.

BACKGROUND OF THE INVENTION

Food trays intended to be supported directly on a user's lap are known in the art, as evidenced by U.S. Pat. No. 2,808,191 to Cramer. In particular, the prior art has suggested food trays which are specifically designed and configured with an emphasis on the structure by which a food tray is secured to the user's lap. As an example, U.S. Pat. No. 2,663,603 to Newman discloses a planar tray which includes two pairs of rigid knee clamps that are cantilevered from the lateral edges of the tray. The knee clamps are each biased inwardly against the outer surfaces of the user's legs by springs housed within the structure of the tray. As one can appreciate, the tray taught by Newman can readily generate a clamping force which will reliably secure the tray to the user's lap. However, significant disadvantages with the tray taught by Newman include the discomfort of the user due to pressure being continuously applied to his or her legs, and the inability to quickly remove the tray in circumstances where time is of the essence. A particularly notable example of such a circumstance is where the tray is used by an occupant of an automobile. In case of an accident, the ability of the user to quickly exit the automobile may be critical. However, the binding and restraining effect that the knee clamps have on the user's legs would significantly hinder the user's mobility, and therefore delay the user's exit.

Another example of a food lap tray is disclosed in U.S. Pat. No. 5,127,339 to Hood, Jr., which teaches a foldable structure having lateral portions which wrap around the user's legs and interlock beneath the user when seated. While Hood, Jr., reduces the potential for discomfort noted with the knee clamps taught by Newman, the interlocking configuration of the lateral portions tends to bind the user's legs so as to severely restrict the movement of the user. In addition, the tray taught by Hood, Jr., can be rather awkward to put on and remove, particularly if the user is seated within the confines of an automobile. In contrast to both Newman and Hood, Jr., U.S. Pat. No. 5,069,375 to Flick does not rely on the user's legs to secure a food tray to the user's lap, but instead relies on the automobile lap belt to secure the food tray in place. Accordingly, the teachings of Flick are primarily limited to a food tray for use in an automobile. While the discomfort of a leg restraint is not present in the teachings of Flick, several disadvantages do exist. A first is that the food tray can be lifted off the lap of the user because the food tray is not physical secured to the user's lap. Secondly, the food tray is secured with the lap belt of an automobile, which may potentially interfere with the user's escape from the automobile in the case of an emergency.

Therefore it would be advantageous to provide a food lap tray which can be positively secured and stabilized on the lap of a user, yet will not cause discomfort to the user, and will not bind or restrain the legs of the user. It would also be desirable if such a food lap tray could be rapidly secured to and removed from the lap of the user, and could be secured without relying on other fastening systems used by the user. Importantly, it would be especially desirable if such a food lap tray were constructed and used so as not to hinder the user from rapidly exiting an automobile if immediate escape is necessary.

SUMMARY OF THE INVENTION

It is an object of this invention to provide a food lap tray of the type which is particularly suited for use as a fast food lap tray while the user is seated in an automobile.

It is another object of this invention that such a lap tray be adapted to be secured directly to the lap of the user, without causing physical discomfort to the user, or binding the legs of the user, or otherwise excessively restraining the user's legs during use.

It is a further object of this invention that such a lap tray utilize leg straps which are sufficiently long to be tucked beneath the legs of the user when seated, but are not so long as to wrap entirely around the legs of the user, such that the lap tray can be easily secured to the user and rapidly removed while the user is seated, so as to not hinder the user from rapidly removing the lap tray if the user must quickly exit the automobile.

It is yet another object of this invention that such a lap tray be specifically configured in order to promote its stability on the lap of the user.

In accordance with a preferred embodiment of this invention, these and other objects and advantages are accomplished as follows.

According to the present invention, a food lap tray is provided which is particularly suitable for use in an automobile to receive and support fast foods and their containers. The food lap tray is adapted to be positively secured to the lap of a user, yet will not cause discomfort to the user and will not bind or excessively restrain the legs of the user during use. In particular, the food lap tray is specifically adapted to enable it to be rapidly positioned and stabilized on the lap of the user, as well rapidly removed from the lap of the user. In addition, the food lap tray does not rely on other fastening systems used by the user, such as a vehicle lap belt, and will not hinder the user from rapidly exiting an automobile if immediate escape is necessary.

The food lap tray of this invention generally includes a body which is formed to be relatively rigid in order to properly support articles on its upper surface. The body may be formed from a rigid material, such as a relatively lightweight foam material or cardboard, though the body may alternatively be formed as an inflatable body. In addition to its upper surface, the body includes a lower surface oppositely disposed from the upper surface, a first lateral end, and a second lateral end oppositely disposed from the first lateral end. The first and second lateral ends generally define a lateral axis of the body. At least one recess is formed in the upper surface of the body for the purpose of receiving food as served or packaged by fast food establishments. The food lap tray further includes a pair of troughs formed in the lower surface of the body. The troughs are formed to be approximately parallel to each other, and extend across the lower surface of the body in a direction approximately transverse to the lateral axis of the body. Each of the troughs is sized and contoured to comfortably receive one of the user's legs when the user is seated. One of the troughs is preferably sized to closely conform to a corresponding one of the user's legs in order to laterally stabilize the food lap tray relative to the leg, while the other trough is preferably sized to permit a significant degree of movement for the user's other leg. As a result, the user is able to actively stabilize the food lap tray by properly positioning his or her free leg beneath the food lap tray.

The food lap tray also includes a pair of leg straps, each of which is attached to a corresponding one of the first and second lateral ends. The leg straps are formed from a pliant material such that the leg straps can be easily wrapped around the outer lateral surfaces of the user's legs when seated, and thereafter tucked beneath the user's legs without requiring the user to stand up or otherwise move in a manner which would be awkward within the confines of an automobile. As an important aspect of this invention, the length of each leg strap is limited, such that each will be sufficiently long to extend beneath only its corresponding leg of the user when the food lap tray is positioned on the lap of the user. Preferably, the terminal ends of the leg straps do not overlap each other when the food lap tray is positioned on the lap of the user, such that the leg straps cannot be entirely wrapped around the user's legs, which would otherwise unnecessarily bind and restrain the user's legs. Therefore, the length of the leg straps need only be sufficient to enable the terminal end of each leg strap to become trapped beneath the corresponding leg of the user, with any length in excess of this being unnecessary and potentially detrimental to the use of the food lap tray.

From the above, it can be seen that an advantage to the present invention is that the food lap tray can be easily secured to the lap of the user by tucking each of the leg straps beneath a corresponding leg of the user. Once in place, the food lap tray can be readily stabilized by the user shifting one of his or her legs beneath the tray in order to provide the appropriate support which will properly center and balance the food and food containers on the tray. Furthermore, the food lap tray can be easily removed by withdrawing each of the leg straps from beneath the user's legs. The food lap tray can also be removed simply by the action of the user standing up so as to release the pair of leg straps from beneath the user's legs. As such, the user can generally exit an automobile without first removing the food lap tray of this invention, which is completely contrary to the teachings of the prior art. While the advantages of this invention are most apparent in the context of using the food lap tray in an automobile, the structure of the food lap tray is also advantageous under other circumstances where mobility of the user is generally limited, such as when the user is seated in a stadium and theater seat.

Other objects and advantages of this invention will be better appreciated from the following detailed description.

BRIEF DESCRIPTION OF THE DRAWINGS

The above and other advantages of this invention will become more apparent from the following description when taken in conjunction with the accompanying drawing, in which.

DETAILED DESCRIPTION OF THE INVENTION

Figure 1:
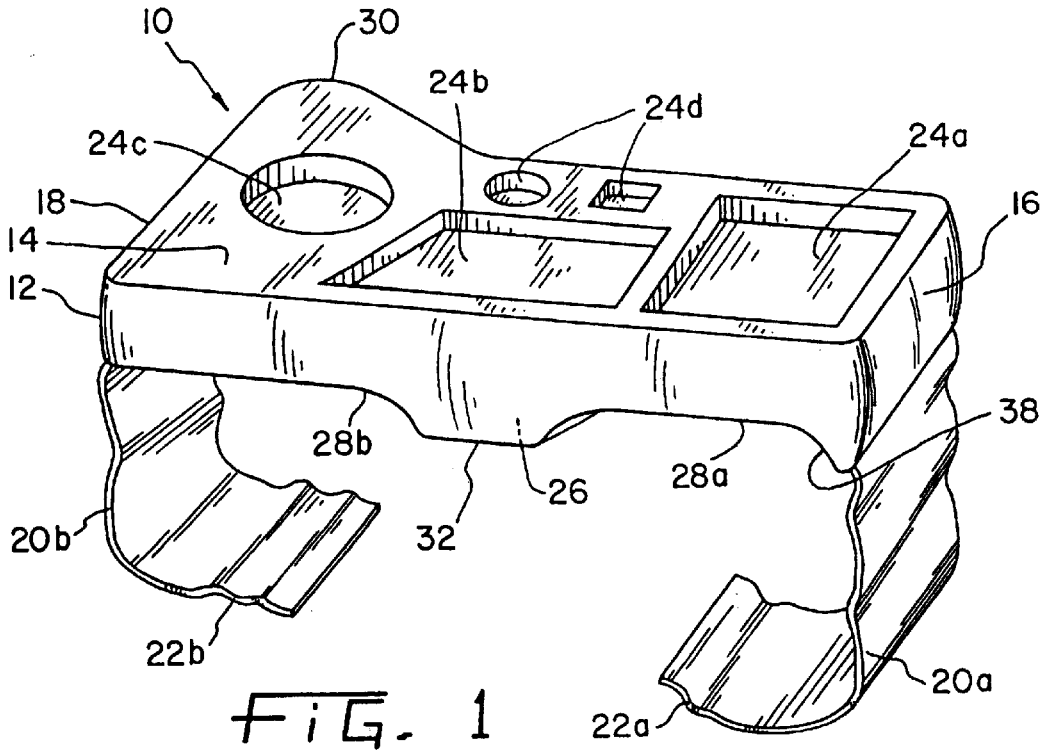
FIG. 1 is a perspective view of a fast food lap tray in accordance with a preferred embodiment of this invention.
Figure 2:
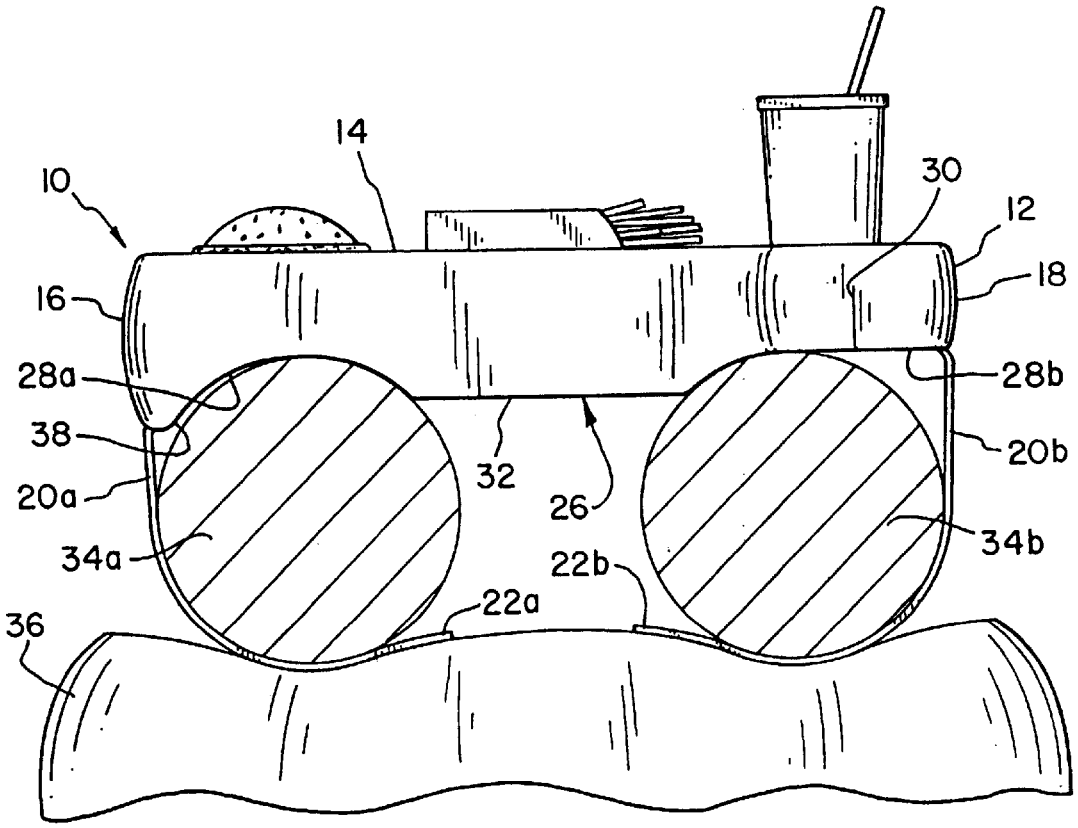
FIG. 2 is a front edge view of the fast food lap tray of FIG. 1, as shown in position on the lap of a user.

As shown in FIGS. 1 and 2, the present invention provides a food lap tray 10 which is particularly suited for supporting fast food on the lap of an individual seated in an automobile. As such, certain characteristics of the lap tray 10 are specifically tailored to facilitate the use of the lap tray 10 within the confines of an automobile. For example, the lap tray 10 is adapted to be positively secured to the lap of a user, as represented in FIG. 2. However, the lap tray 10 is also configured so as not to cause discomfort to the user, nor bind or excessively restrain the legs of the user during use. As a particular safety feature of this invention, the lap tray 10 is specifically adapted to enable rapid positioning on the lap of the user, as well rapid removal from the lap of the user. Otherwise, use of the lap tray 10 might create a hazardous distraction within the automobile. To further facilitate its use, the lap tray 10 does not rely on the vehicle's passenger restraint system, such as the user's lap belt. Lastly, the lap tray 10 is not secured around any portion of the user, and therefore will not hinder the user from rapidly exiting the automobile if immediate escape is necessary.

With reference to FIG. 1, the lap tray 10 of this invention includes a generally planar tray body 12. The tray body 12 is preferably formed to be relatively rigid in order to properly support fast foods and their containers on its upper surface 14. The tray body 12 may be formed from various suitable materials known in the art, such as relatively light-weight structural polymeric foams including polystyrene, polypropylene, polyethylene, and polyurethane, though a wide variety of other polymeric materials could foreseeably be used. In addition, the tray body 12 could be formed from a disposable and biodegradable material, such as cardboard. Alternatively, the tray body 12 can be formed as an inflatable plastic body whose shape and appearance is in accordance with that shown in the Figures.

The upper surface 14 of the tray body 12 preferably has the perimetric shape shown in FIG. 1, and includes recesses or wells that form compartments for fast food items, packages and containers. For example, the compartments preferable include a sandwich receptacle 24a, a french fry receptacle 24b, a beverage receptacle 24c and condiment receptacles 24d. Fewer or more receptacles could be provided, as dictated by circumstances. As shown in FIG. 1, a lobe 30 preferably extends forwardly from the tray body 12 to accommodate at least a portion of the beverage receptacle 24c. The lobe 30 and the position of the beverage receptacle 24c cooperate to shift the center of gravity of the lap tray 10 forward and toward the left leg 34b of the user, particularly if a beverage container is present in the beverage receptacle 24c. As such, the stability of the lap tray 10 is enhanced in that the user's left leg 34b can be used to balance the lap tray 10 on the user's lap, while the user's right leg 34a, whose mobility is limited during the operation of a vehicle in order to operate the accelerator pedal, provides lateral stability to the lap tray 10. The stability of a beverage in the beverage receptacle 24c is also enhanced due to its particular location on the upper surface 14 of the lap tray 10.

Oppositely disposed from the upper surface 14 is a lower surface 26 of the tray body 12. Formed in the lower surface 26 is a pair of approximately parallel troughs 28a and 29b separated by a central rib 32. Each of the troughs 28a and 28b is sized and contoured to comfortably receive one of the user's legs 34a or 34b when the user is seated in a seat 36 of an automobile, as represented by FIG. 2. The trough 28a on the righthand side of the user (as depicted in FIG. 2) is further delineated by a lateral edge 38 which extends downwardly from the right lateral end 16 of the tray body 12. As such, the lateral edge 38 and the central rib 32 cooperate to laterally stabilize the tray body 12 about the user's right leg 34a. In contrast, the trough 28b on the lefthand side of the user is not delineated in this manner, but preferably extends uninterrupted to the left lateral end 18 of the tray body 12 so as to permit greater freedom of movement of the user's left leg 34b. This aspect of the present invention is advantageous in that it allows the user to more reliably stabilize a beverage container received in the beverage receptacle 24c by appropriately positioning his or her left leg 34b within the trough 28b. This greater freedom of movement is also beneficial when operating the clutch pedal of an automobile with a manual transmission. Accordingly, the troughs 28a and 28b, the central rib 32 and the lateral edge 38 cooperate to stabilize the lap tray 10 on the user's lap by limiting the ability of the lap tray 10 to move laterally when secured to the user's legs 34a and 34b, yet permit a sufficient degree of movement of the user's left leg 34b to properly support and balance the lap tray 10, while also enabling operation of a clutch pedal.

Attached to the right and left lateral ends 16 and 18 of the tray body 12 are a pair of leg straps 20a and 20b, respectively. The leg straps 20a and 20b are formed from a pliant material such that the leg straps 20a and 20b can be easily wrapped around the outer lateral surfaces of the user's legs 34a and 34b and tucked beneath the legs 34a and 34b, all while the user remains seated. Suitable materials include natural and synthetic materials, which can be woven or in sheet form, as is known in the relevant art. The leg straps 20a and 20b can be adhered or mechanically fastened to the tray body 12. Alternatively, the leg straps 20a and 20b can be molded into the tray body 12 if formed from a moldable material, such as the above-noted polymeric foam materials. The leg straps 20a and 20b may also be sewn to the right and left ends 16 and 18 of the lap tray 10 if the tray body 12 is designed to be inflatable.

Due to their construction, the leg straps 20a and 20b are adapted to be tucked beneath the user's legs 34a and 34b, respectively, without requiring the user to stand up or otherwise move in a manner which would be awkward within the confines of an automobile. To achieve this important aspect of the present invention, the leg straps 20a and 20b are each specifically sized to have a relatively short length, such that each will be sufficiently long to extend beneath only their corresponding leg 34a or 34b of the user when the lap tray 10 is positioned on the user's lap. As such, the ends 22a and 22b of the leg straps 20a and 20b, respectively, preferably do not overlap each other when the lap tray 10 is positioned on the lap of the user, as illustrated in FIG. 2. In addition, the leg straps 20a and 20b cannot wrap entirely around the user's legs 34a and 34b, which might otherwise unnecessarily bind and restrain the legs 34a and 34b while the user is seated. The use of a fastener, such as VELCRO or a clasp, to secure the ends 22a and 22b of the leg straps 20a and 20b together is also contrary to this invention, in that such an approach would bind and restrain the user's legs 34a and 34b when seated in an automobile seat, and would also render the lap tray 10 awkward to secure and remove from the user's lap. Therefore, an important aspect of this invention is that the length of the leg straps 20a and 20b are sufficient only to enable the ends 22a and 22b of the leg straps 20a and 20b to be secured beneath the legs 34a and 34b of the user, with any length in excess of this being unnecessary and potentially detrimental to the use of the lap tray 10 of this invention. In practice, and as shown in FIGS. 1 and 2, the length of each leg strap 20a and 20b is about one-half to about the full width of the lap tray 10, as measured between its ends 16 and 18. To enhance the ability of the leg straps 20a and 20b to secure the lap tray 10 to the user's lap, it is also preferable that the leg straps 20a and 20b be relatively wide in order to maximize the ability of the user's legs 34a and 34b to adequately secure the leg straps 20a and 20b in place. As shown in FIG. 1, a preferred embodiment is for the width of the leg straps 20a and 20b to extend along a significant portion of each edge defined by the right and left lateral ends 16 and 18 of the tray body 12. Though it is foreseeable that two or more individual straps could serve as a substitute for each of the single leg straps 20a and 20b of this invention, it is anticipated that the ability to rapidly and reliably secure the lap tray 10 to the user's legs 34a and 34b would be hindered.

From the above, it can be seen that an advantage to the present invention is that the fast food lap tray 10 can be easily secured to and removed from the lap of the user, while also providing optimum stability when positioned on the user's lap. In particular, the lap tray 10 can be positively and directly secured to the user's lap while the user remains seated in an automobile. By simply shoving the ends 22a and 22b of the leg straps 20a and 20b beneath the user or, at most, slightly lifting the legs 34a and 34b of the user, the lap tray 10 can be secured in place and will resist being lifted off the user's lap by accidently bumping the lap tray 10. Consequently, the lap tray 10 of this invention is particularly suited for use in an automobile, where mobility of the occupants is limited.

Another advantage of this invention is that, though the lap tray 10 is adapted to be positively secured to the lap of the user, the manner in which the leg straps 20a and 20b secure the lap tray 10 in place will not cause discomfort to the user and will not bind or excessively restrain the legs 34a and 34b of the user during use. Specifically, the ends 22a and 22b of the leg straps 20a and 20b are not fastened together, such that the leg straps 20a and 20b cannot bind or excessively restrain the legs 34a and 34b of the user. Furthermore, the relatively short lengths of the leg straps 20a and 20b prevent their ends 22a and 22b from overlapping which, in effect, could hinder the removal of the lap tray 10. Consequently, the lap tray 10 is specifically adapted to enable rapid positioning on, as well rapid removal from, the lap of the user. For example, the lap tray 10 can be easily removed by withdrawing each of the leg straps 20a and 20b from beneath the user's legs 34a and 34b, or by the user simply standing up. As such, the user can generally exit an automobile without first removing the lap tray 10 of this invention, which is completely contrary to the teachings of the prior art.

In addition, another advantage of the lap tray 10 of this invention is that it does not rely on other fastening systems used by the user, such as a vehicle lap belt. Again, such a feature enables the user to rapidly exit an automobile if immediate escape is necessary. The lap tray 10 is also stable on the user's lap as a result of the cooperation between the troughs 28a and 28b, the central rib 32 and the lateral edge 38 on the lower surface 26 of the tray body 12, and the position of the lobe 30 and the beverage receptacle 24c over the user's left leg 34b near the front edge of the tray body 12. More specifically, the lap tray 10 of this invention is very stable on the user's lap because lateral movement of the lap tray 10 is limited by the user's right leg 34a, while a sufficient degree of movement of the user's left leg 34b is enabled to properly support and balance the lap tray 10 on the user's lap.

While the advantages of this invention are most apparent in the context of using the lap tray 10 in an automobile, it is apparent that its construction makes it also advantageous for use in numerous other circumstances where mobility of the user is generally limited, such as in a stadium or theater seat.

In addition, while our invention has been described in terms of a preferred embodiment, it is apparent that other forms could be adopted by one skilled in the art—such as, by modifying the shape of the tray body 12, utilizing different materials from that noted, altering or modifying the arrangement of the receptacles 24a–d on the upper surface 14 of the lap tray 10, or modifying the lap tray 10 in order to be adapted for use in circumstances other than those noted here. Accordingly, the scope of our invention is to be limited only by the following claims.

The embodiments of the invention in which an exclusive property or privilege is claimed are defined as follows:

1. A food lap tray adapted to be secured to the lap of a user solely in cooperation with the user's legs while the user is seated, the food lap tray comprising:

a body having an upper surface, a lower surface oppositely disposed from the upper surface, a first lateral end, and a second lateral end oppositely disposed from the first lateral end, the first and second lateral ends defining a lateral axis and a lateral width of the body;

at least one recess formed in the upper surface of the body;

[a pair of troughs formed in the lower surface of the body, the pair of troughs extending across the lower surface of the body in a direction approximately transverse to the lateral axis of the body;] and a pair of leg straps, each of the pair of leg straps being attached to a corresponding one of the first and second lateral ends, each of the pair of leg straps being formed from a material that is sufficiently pliant to allow each of the pair of leg straps to extend downwardly from the first and second lateral ends and then fold inwardly and horizontally beneath the body, *each of the pair of leg straps being free of any means for fastening the pair of leg straps together while the food lap tray is secured to the lap of the user*;

whereby the food lap tray can be secured to the lap of the user by tucking each of the pair of leg straps beneath a corresponding one of the user's legs, and the food lap tray can be removed by retrieving the pair of leg straps from beneath the user's legs, and can also be removed by the action of the user standing up so as to release the pair of leg straps from beneath the user's legs.

2. A food lap tray as recited in claim 1 wherein the length of each leg strap is equal to approximately one-half of the lateral width of the body.

3. A food lap tray as recited in claim 1 wherein the body is formed from a rigid material.

4. A food lap tray as recited in claim 1 wherein the body comprises an inflatable body.

5. A food lap tray as recited in claim 1 further comprising:

a beverage receptacle formed in the upper surface of the body and located proximate the first lateral end of the body; and a lateral edge extending downwardly from the second lateral end of the body so as to limit movement of a corresponding one of the user's legs.

6. A food lap tray as recited in claim 5 *further comprising a pair of troughs formed in the lower surface of the body, the pair of troughs extending across the lower surface of the body in a direction approximately transverse to the lateral axis of the body,* wherein a first trough of the pair of troughs extends uninterrupted to the first lateral end of the body so as to enable movement of a first of the user's legs, and wherein a second trough of the pair of troughs is delineated by a downwardly-projecting lateral edge at the second lateral end of the body so a to limit movement of a second of the user's legs.

7. A fast food lap tray adapted to be secured to the lap of a user solely in cooperation with the user's legs while the user is seated, the food lap tray comprising:

a body having an upper surface, a lower surface oppositely disposed from the upper surface, a first lateral end, a second lateral end oppositely disposed from the first lateral end, and a front edge intermediate the first and second lateral ends, the first and second lateral ends defining a lateral axis and a lateral width of the body;

a plurality of recesses formed in the upper surface of the body;

a pair of troughs formed in the lower surface of the body, the pair of troughs extending across the lower surface of the body in a direction approximately transverse to the lateral axis of the body, a first trough of the pair of troughs extending uninterrupted to the first lateral end of the body so as to enable a degree of movement of a first leg of the user received in the first trough;

a lateral edge extending downwardly from the second lateral end of the body so as to delineate a second trough of the pair of troughs and thereby limit movement of a second leg of the user received in the second trough; and a pair of leg straps, each of the pair of leg straps being attached to a corresponding one of the first and second lateral ends, each of the pair of leg straps being formed from a material that is sufficiently pliant to allow each of the pair of leg straps to extend downwardly from the first and second lateral ends and then fold inwardly and horizontally beneath the body;

whereby the fast food lap tray can be secured to the lap of the user by tucking each of the pair of leg straps beneath a corresponding one of the user's legs, and the fast food lap tray can be balanced on the lap of the user by appropriately positioning the first leg of the user within the first trough.

8. A food lap tray as recited in claim 7 further comprising a beverage receptacle formed in the upper surface of the body and located proximate the first lateral end of the body.

9. A food lap tray as recited in claim 8 further comprising a lobe located proximate the first lateral end of the body and extending from the front edge of the body, the beverage receptacle being formed at least partially within the lobe.

10. A fast food lap tray as recited in claim 7 wherein the length of each leg strap is equal to approximately one-half of the lateral width of the body.

11. A fast food lap tray as recited in claim 7 wherein the body is formed from a rigid material.

12. A fast food lap tray as recited in claim 7 wherein the body comprises an inflatable body.

13. A fast food lap tray adapted to be secured to the lap of a user solely in cooperation with the user's legs while the user is seated, the food lap tray comprising:

a rigid tray body having an upper surface, a lower surface oppositely disposed from the upper surface, a right lateral end, a left lateral end oppositely disposed from the right lateral end, and a front edge intermediate the right and left lateral ends, the right and left lateral ends defining a lateral axis of the tray body, the tray body having a lateral width between the right and left lateral ends;

recesses formed in the upper surface of the tray body and comprising receptacles for a beverage cup, a sandwich and condiments;

a lobe extending from the front edge of the tray body proximate to the left lateral end so as to be substantially coplanar with the upper surface of the tray body, the receptacle for the beverage cup being located at least partially in the lobe;

a pair of troughs formed in the lower surface of the body and separated by a rib portion of the lower surface, the pair of troughs extending across the lower surface of the body in a direction approximately transverse to the lateral axis of the body, a left trough of the pair of troughs extending uninterrupted to the left lateral end of the body so as to enable a degree of movement of a left leg of the user received in the left trough;

a lateral edge extending downwardly from the right lateral end of the body so as to delineate a right trough of the pair of troughs and thereby limit movement of a right leg of the user received in the right trough; and a pair of leg straps formed from a pliant material, each of the pair of leg straps being attached to a corresponding one of the right and left lateral ends and having a free terminal end, the length of each leg strap being about one-half the lateral width of the tray body such that the terminal end of each of the pair of leg straps can be trapped beneath a corresponding adjacent leg of the user without the terminal ends of the pair of leg straps overlapping each other when the fast food lap tray is positioned on the lap of the user, the pliant material being sufficiently pliant to allow each of the pair of leg straps to extend downwardly from their respective left and right lateral ends and then fold inwardly and horizontally beneath the tray body;

whereby the fast food lap tray can be secured to the lap of the user by tucking each of the pair of leg straps beneath a corresponding one of the user's legs, and the fast food lap tray can be removed by retrieving the pair of leg straps from beneath the corresponding leg, and can also be removed by the action of the user standing up so as to release the pair of leg straps from beneath the user's legs.

* * * * *